Aug. 30, 1966  D. C. BEER  3,268,920
DEBRIS COLLECTOR FOR FLUID RECEPTACLE OUTLETS OF VARIOUS SIZES
Filed Oct. 29, 1963  2 Sheets-Sheet 1
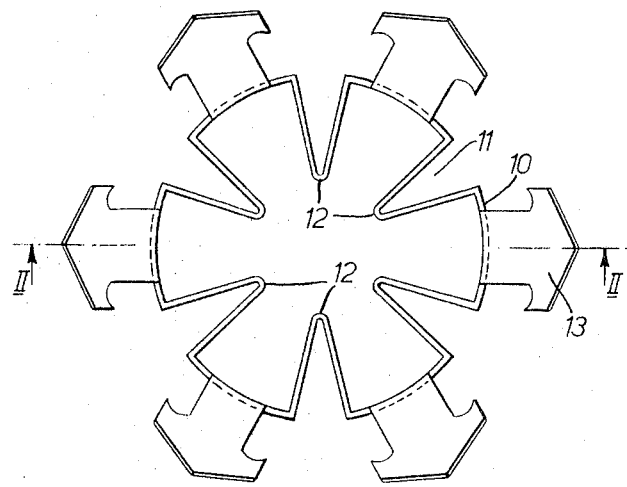
FIG. I.
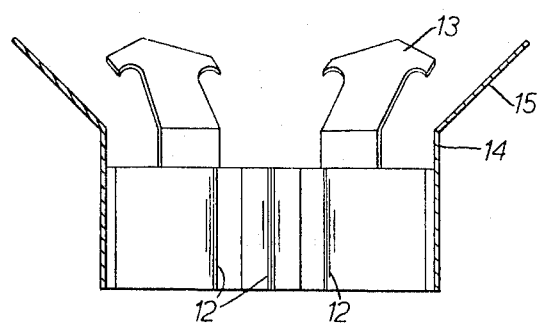
FIG. 2.
Donald Courtney Beer
INVENTOR
BY
Lawrence E. Laubscher
ATTORNEY Aug. 30, 1966 D. C. BEER 3,268,920
DEBRIS COLLECTOR FOR FLUID RECEPTACLE OUTLETS OF VARIOUS SIZES
Filed Oct. 29, 1963 2 Sheets-Sheet 2

Donald Courtney Beer
INVENTOR

BY
Lawrence E. Laubscher
ATTORNEY

3,268,920
DEBRIS COLLECTOR FOR FLUID RECEPTACLE OUTLETS OF VARIOUS SIZES
Donald C. Beer, Lewes, Sussex, England, assignor to Vortex Products (Hairdressers Sundries) Limited
Filed Oct. 29, 1963, Ser. No. 319,851
Claims priority, application Great Britain, Nov. 6, 1962, 41,926/62
8 Claims. (Cl. 4—292)

This invention relates to waste traps which are designed to prevent solids going down the outlet of a bath, basin or like receptacle, so that the waste pipes become choked.

Baths, basins, etc. are usually provided with an apertured plate, recessed into the outlet to the waste pipe, which is desinged to trap solids, but these are not effective to trap certain solids, e.g. human hairs, when there is a virtually continuous flow of water, as for example, in a hairdressing establishment.

It is therefore a primary object of the present invention to provide a device which is effective to trap hairs or other strand-like waste which might cause blockage of the waste pipe.

According to the invention, there is provided a waste trap for insertion into the outlet of a fluid receptacle, comprising a support structure providing a passage therethrough, and having finger members upstanding from said structure, said members in use, pointing into the receptacle.

In order that the invention may be more clearly understood, two embodiments thereof will now be described, by way of example, with reference to the drawings accompanying the provisional specification, in which:

FIGURE 1 shows a plan view of a waste trap according to the invention; and

FIGURE 2 shows a section on II—II in FIGURE 1, and with reference to the accompanying drawings, in which:

Figure 3:
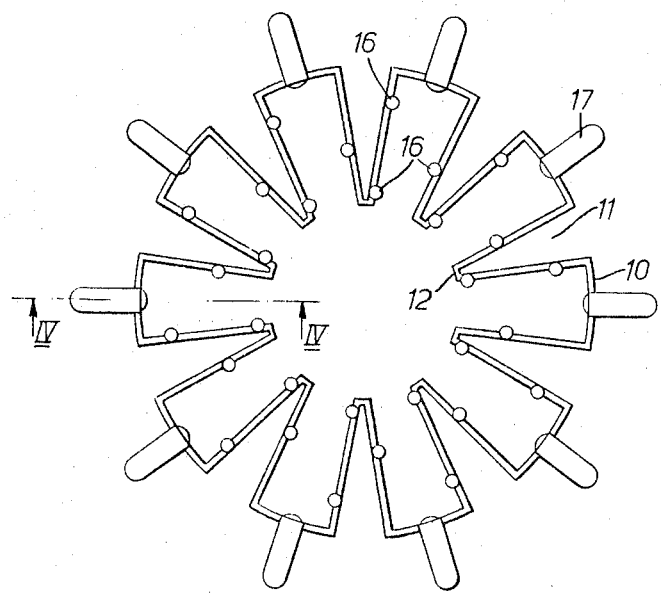
FIGURE 3 shows a plan view of a second embodiment of a waste trap.

As seen in FIGURE 1 the waste trap is generally circular in shape, to fit into the usually circular outlets in baths, basins or other receptacles. The support structure, in the form of a long narrow strip, is shaped as a series of arcs 10, in this case six, with triangular indentations 11 in between. The apieces 12 of the indentations lie on a circle concentric with the arcs, and the general outline might therefore be described as that of a multi-arm maltese cross. Upstanding from this support structure are a number of finger members (in this case only barbed ones are shown) designed to trap the waste. Thus, integral with the strip and upstanding from the edges of the arcs 10 are barbs 13, one on each arc. The first portion 14 of barb continues upwardly in the same plane as the arc for a short distance and is then bent outwards at an angle of 45° at the end portion 15. There may also be provided extra finger members in the form of small, upstanding spikes (not shown), of about the same height as the first portion of the barbs, along the upper edges of the triangular indentations. The outer diameter of the arcs is made slightly larger than the outlet that the trap is to fit so that it can itself act as a spring to hold itself in place.

Figure 4:
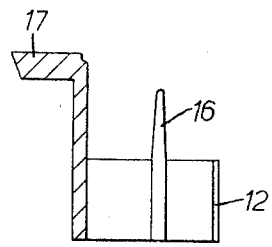
FIGURE 4 shows a section on IV—IV in FIGURE 3.

FIGURE 3 shows a second embodiment of a waste trap and shows the upstanding spikes 16 on the triangular indentations. The barbs have been replaced by members 17 which stand straight up from the edge of the arcs 10 and are then directed perpendicularly outwards, as seen clearly in FIGURE 4.

In use, a trap is inserted, with the finger members pointing into the receptacle, into the outlet and pushed in as far as the angle in the barbs 13 or members 17. In this position, very little area of the outlet is actually blocked, but the barbs, and the spikes, are very effective in trapping hairs or other strand-like waste which becomes entangled on them. The waste traps are made of a thin, resilient, waterproof material e.g. synthetic plastic, nylon, waxed card, or the like, any of which is cheap and expendable, and thus, when the trap is itself becoming blocked, it can be removed and thrown away.

Although the first embodiment described has six arcs and indentations, any desired number may be used, and ten has proved a suitable number as seen in FIGURE 3. Nor is the angle of the end part of the barbs critical. Further, the trap may be moulded in a single piece without joints, or shaped from a strip which is joined end to end.

Due to the particular construction, only one size of waste trap need be manufactured, since the outer diameter can be reduced simply by squeezing the trap inwards so that it will fit small outlets as well as large.

I claim:

1. A waste trap adapted for insertion within receptacle outlets of various sizes for collecting debris from fluid discharged therethrough, comprising
   a generally-circular resilient radially-expansible support member adapted for frictional mounting coaxially within a receptacle outlet, said support member containing a central through passage, and a plurality of finger members extending generally axially from said support member in the direction of said receptacle.

2. A waste trap according to claim 1, wherein said support and finger members are molded integrally from a synthetic plastic material.

3. A waste trap according to claim 1 wherein said support member is formed from a continuous strip providing a plurality of thin wall elements lying, when in use, in planes parallel to the general direction of fluid flow through the outlet.

4. A waste trap according to claim 3 wherein said thin wall elements are shaped to form exterior outlet-contacting wall portions and interior wall portions.

5. A waste trap according to claim 4 wherein said exterior wall portions are in the form of circular arcs and said interior wall portions form triangular indentations between said arcs.

6. A waste trap according to claim 4 wherein said finger members extend outwardly from those edges of the outlet-contacting wall portions which, in use, face toward the interior of the receptacle.

7. A waste trap according to claim 4, wherein said exterior wall portions carry barbed finger members extending from their edges generally transversely of said strip.

8. A waste trap according to claim 4 wherein said interior wall portions carry finger members in the form of straight spikes extending from their edges generally transversely of said strip.

References Cited by the Examiner

UNITED STATES PATENTS

| 333,935 | 1/1886 | Duncan | 4—292 |
|---|---|---|---|
| 782,860 | 2/1905 | Lever | 4—292 |
| 1,886,676 | 11/1932 | Heuhacker | 4—292 |
| 2,440,165 | 4/1948 | Behrend | 4—292 |
| 2,506,669 | 5/1950 | Heuhacker | 4—292 |

FOREIGN PATENTS 574,761   4/1933   Germany.

LAVERNE D. GEIGER, *Primary Examiner.*

H. GROSS, *Examiner.*